(12) United States Patent
Rising, III (10) Patent No.: US 7,089,543 B2
(45) Date of Patent: Aug. 8, 2006

(54) USE OF FORMAL LOGIC SPECIFICATION IN CONSTRUCTION OF SEMANTIC DESCRIPTIONS

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 722 days.

(21) Appl. No.: 10/197,355

(22) Filed: Jul. 15, 2002

(65) Prior Publication Data

US 2003/0037301 A1 Feb. 20, 2003

Related U.S. Application Data

(60) Provisional application No. 60/305,448, filed on Jul. 13, 2001.

(51) Int. Cl.
G06F 9/45 (2006.01)
(52) U.S. Cl. .................. 717/144; 717/143; 706/55
(58) Field of Classification Search ........ 717/132–133, 717/141–144, 155–157; 706/45, 47, 55
See application file for complete search history.

(56) References Cited

U.S. PATENT DOCUMENTS

| | | | |
|---|---|---|---|
| 5,579,471 A | | 11/1996 | Barber et al. |
| 5,784,539 A | * | 7/1998 | Lenz ............................. 706/45 |
| 5,806,051 A | * | 9/1998 | Bruno et al. .................... 706/3 |
| 5,963,739 A | * | 10/1999 | Homeier ...................... 717/126 |
| 6,049,332 A | * | 4/2000 | Boetje et al. ............... 715/721 |
| 6,292,938 B1 | * | 9/2001 | Sarkar et al. ................ 717/138 |
| 6,314,562 B1 | * | 11/2001 | Biggerstaff .................. 717/156 |
| 6,400,996 B1 | * | 6/2002 | Hoffberg et al. .............. 700/83 |
| 6,473,748 B1 | * | 10/2002 | Archer ......................... 706/45 |
| 6,492,998 B1 | | 12/2002 | Kim et al. |
| 6,618,852 B1 | * | 9/2003 | van Eikeren et al. ....... 717/108 |
| 6,826,566 B1 | * | 11/2004 | Lewak et al. ................... 707/4 |
| 6,829,603 B1 | * | 12/2004 | Chai et al. ...................... 707/5 |
| 6,876,779 B1 | * | 4/2005 | Rising, III .................. 382/276 |

OTHER PUBLICATIONS

Ludascher et al, "Referential actions as logical rules", ACM PODS, pp. 217-227, 1997.*
Brassel et al, "A semantics for tracing declarative multi paradigm programs", ACM PPDP, pp. 179-190, 2004.*
Bozga et al, "Storeless semantics and alias logic", ACM PEMP, pp. 55-65, 2003.*
Grosof et al, "Description logic programs combining logic programs with description logic", ACM WWW, pp. 48-57, 2003.*
ISO, Coding of Moving Pictures and Audio, MPEG-7 Overview, International Organisation for Standardisation, ISO/TECJTC1/SC29/WG11 N3445, Geneva, SW, May/Jun. 2000, Version 3.0 pp. 1-55.

(Continued)

*Primary Examiner*—Anil Khatri
(74) *Attorney, Agent, or Firm*—Blakely, Sokoloff, Taylor & Zafman LLP (57) ABSTRACT

An occurrence description scheme that describes an occurrence of a semantic entity in multimedia content is encoded into a content description for the content. The occurrence description scheme is extracted from the content description and used by an application to search, filter or browse the content when a full structural or semantic description of the content is not required.

29 Claims, 5 Drawing Sheets

OTHER PUBLICATIONS

ISO, Coding of Moving Pictures and Audio, MPEG-7 Overview, International Organisation for Standardisation, ISO/TECJTC1/SC29/WG11 N4509, Pattaya, Dec. 2001, Version 6.0, pp. 1-101.

Kent, Robert E., "The IFF Category Theory Ontology," IFF Foundation Ontology, Jan. 2, 2002, pp. 1-53.

Rising, Hawley K., III, "Formal Specification of Logic in Semantic Description Schemes," International Organisation of Standardisation, ISO/TECJTC/SC29/WG11, Coding of Moving Pictures and Audio, Sydney, Australia, Jul. 2001, 10 pages.

* cited by examiner

USE OF FORMAL LOGIC SPECIFICATION IN CONSTRUCTION OF SEMANTIC DESCRIPTIONS

RELATED APPLICATIONS

This application is related to and claims the benefit of U.S. Provisional Patent application Ser. No. 60/305,448 filed Jul. 13, 2001, which is hereby incorporated by reference.

FIELD OF THE INVENTION

This invention relates generally to the description of multimedia content, and more particularly to constructing semantic descriptions using formal logic specification.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Sony Electronics, Inc., All Rights Reserved.

BACKGROUND OF THE INVENTION

Digital multimedia information is becoming widely distributed through broadcast transmission, such as digital television signals, and interactive transmission, such as the Internet. The information may be in still images, audio feeds, or video data streams. However, the availability of such a large volume of information has led to difficulties in identifying content that is of particular interest to a user. Various organizations have attempted to deal with the problem by providing a description of the information that can be used to search, filter and/or browse to locate the particular content. The Moving Picture Experts Group (MPEG) has promulgated a Multimedia Content Description Interface standard, commonly referred to as MPEG-7 to standardize the content descriptions for multimedia information. In contrast to preceding MPEG standards such as MPEG-1 and MPEG-2, which define coded representations of audio-visual content, an MPEG-7 content description describes the structure and semantics of the content and not the content itself.

Using a movie as an example, a corresponding MPEG-7 content description would contain "descriptors," which are components that describe the features of the movie, such as scenes, titles for scenes, shots within scenes, and time, color, shape, motion, and audio information for the shots. The content description would also contain one or more "description schemes," which are components that describe relationships among two or more descriptors, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

MPEP-7 uses a Data Definition Language (DDL) to define descriptors and description schemes, and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors.

The MPEG-7 DDL is based on the XML (extensible markup language) and the XML Schema standards. The descriptors, description schemes, semantics, syntax, and structures are represented with XML elements and XML attributes. Some of the XML elements and attributes may be optional.

The MPEG-7 content description for a particular piece of content is an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, or in a binary format, such as the binary format specified for MPEG-7 data, known as "BiM," or a mixture of the two formats.

The instance document is transmitted through a communication channel, such as a computer network, to another system that uses the content description data contained in the instance document to search, filter and/or browse the corresponding content data stream. Typically, the instance document is compressed for faster transmission. An encoder component may both encode and compress the instance document or the functions may be performed by different components. Furthermore, the instance document may be generated by one system and subsequently transmitted by a different system. A corresponding decoder component at the receiving system uses the referenced schema to decode the instance document. The schema may be transmitted to the decoder separately from the instance document, as part of the same transmission, or obtained by the receiving system from another source. Alternatively, certain schemas may be incorporated into the decoder.

Description schemes directed to describing content generally relate to either the structure or the semantics of the content. Structure-based description schemes are typically defined in terms of segments that represent physical, spatial and/or temporal features of the content, such as regions, scenes, shots, and the relationships among them. The details of the segments are typically described in terms of signals, e.g., color, texture, shape, motion, etc. The semantic description of the content is provided by the semantic-based description schemes. These description schemes describe the content in terms of what it depicts, such as objects, people, events, and their relationships. Depending on user domains and applications, the content can be described using different types of features, tuned to the area of application. For example, the content can be described at a low abstraction level using descriptions of such content features as objects' shapes, sizes, textures, colors, movements and positions. At a higher abstraction level, a description scheme may provide conceptual information about the reality captured by the content such as information about objects and events and interactions among objects. For example, a high abstraction level description may provide the following semantic information: "This is a scene with a barking brown dog on the left and a blue ball that falls down on the right, with the sound of passing cars in the background."

Current methods for constructing semantic descriptions allow for automatic creation of many low-level descriptions. However, construction of high-level descriptions still requires significant human interaction. One reason for that is the lack of formal specification of logic in MPEG-7 semantic descriptions that would allow computer science specialists to develop software for automatically constructing semantic descriptions of any abstraction level.

SUMMARY OF THE INVENTION

One or more valid content descriptions that can be used as a source of a new description are identified, and a set of formal logic rules is applied to the identified content descriptions. Further, a new content description that conforms to the set of formal logic rules is constructed from the identified content descriptions.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
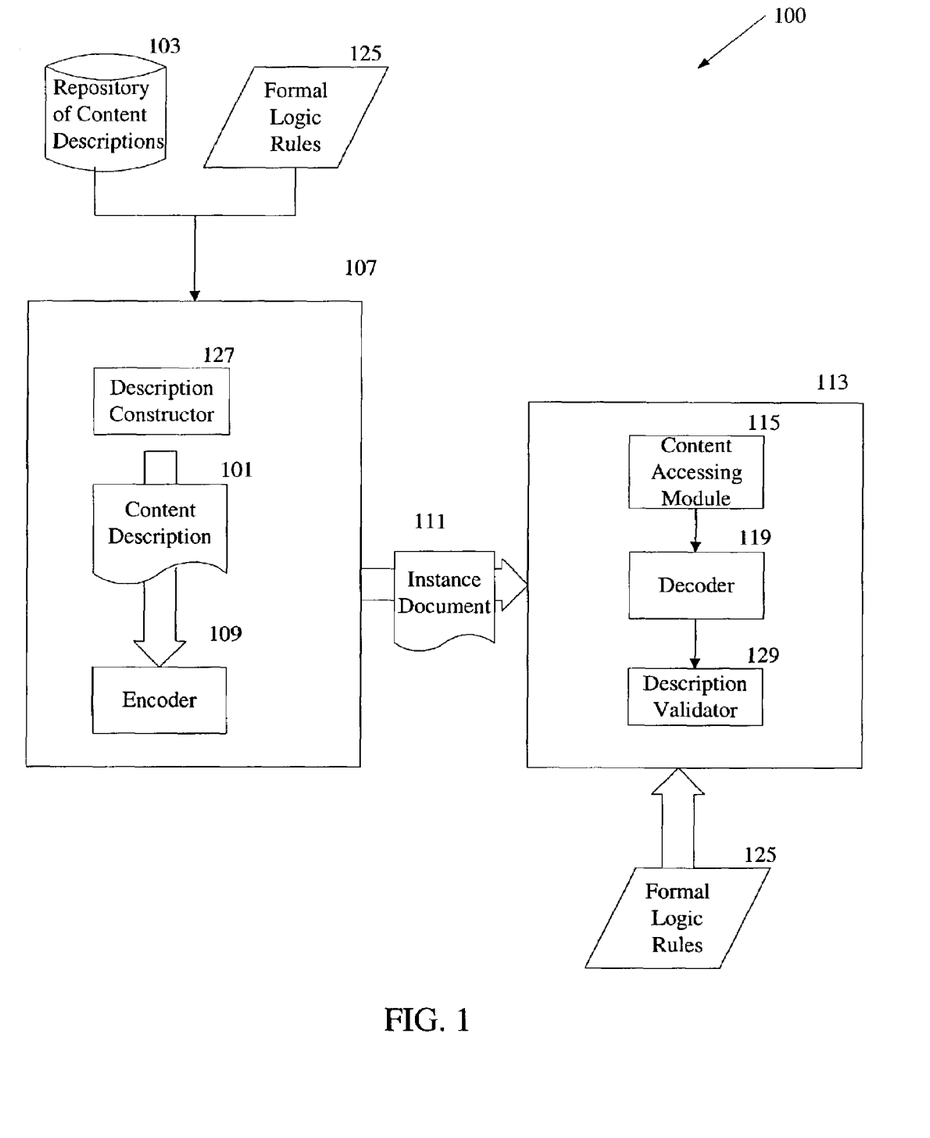
FIG. 1 is a diagram illustrating an overview of the operation of an embodiment of a multimedia content description system according to the invention.

Beginning with an overview of the operation of the invention, FIG. 1 illustrates one embodiment of a multimedia content description system 100. A content description 101 is created by a description constructor 127 on a server 107. The description constructor 127 creates the new content description 101 from one or more existing descriptions stored in a repository 103 of content descriptions. The content description 101 is encoded into an instance document 111 using an encoder 109 on the server 107. The instance document 111 is transmitted by the server 107 to a client system 113.

The client system 113 includes a content accessing module 115 that uses the content description 101 to search, filter and/or browse the corresponding content data stream. The content accessing module 115 may employ a decoder 119 to obtain the structure and semantic information about the content from the instance document 111.

In one embodiment, the description constructor 127 constructs the new content description 101 using formal logic rules 125. The formal logic rules 125 define the requirements for constructing valid content descriptions from existing content descriptions. In another embodiment, the description constructor 127 constructs the new content description 101 without referring to the formal logic rules 129. In this embodiment, a description validator 129 residing on the client system 113 uses the formal logic rules 125 to validate the instance document 111 when it is decoded by the decoder 119. Depending on the result of validation, the decoded information contained in the instance document 111 is either passed to the content accessing module 115 or discarded. It should be noted that the description constructor 127 residing on the server 107 may be either an independent module or a part of the encoder 109. Similarly, the description validator 129 residing on the client system 113 may be either an independent module or part of the decoder 119.

Figure 2:
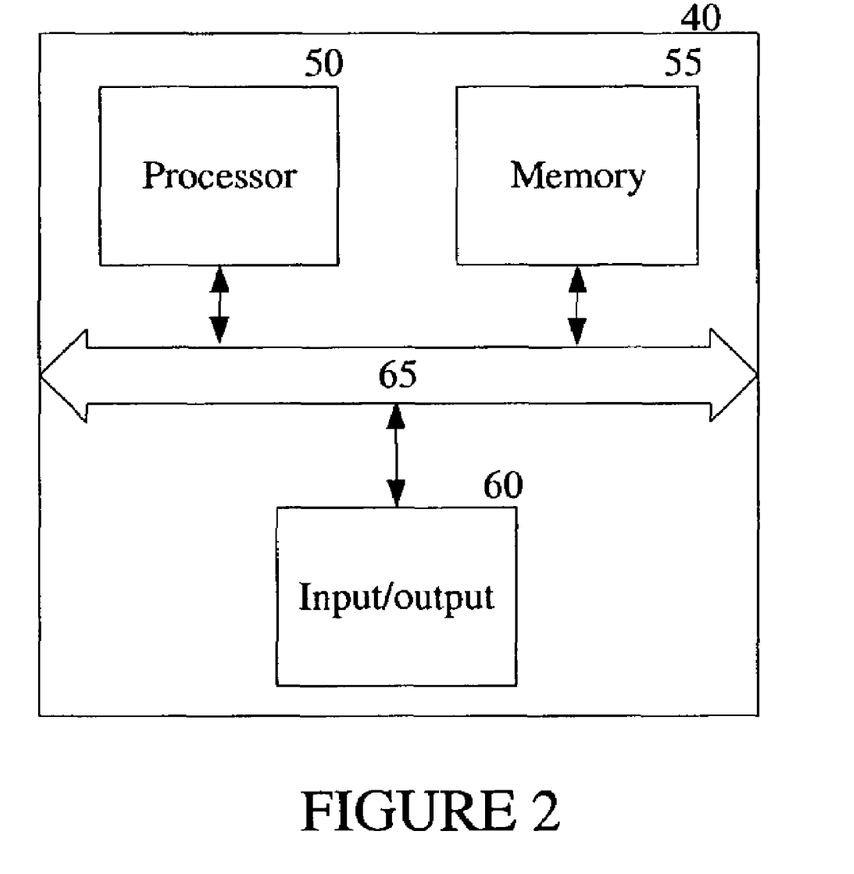
FIG. 2 is a diagram of a computer environment suitable for practicing the invention.

The following description of FIG. 2 is intended to provide an overview of computer hardware and other operating components suitable for implementing the invention, but is not intended to limit the applicable environments. FIG. 2 illustrates one embodiment of a computer system suitable for use as the server and/or client system of FIG. 1. The computer system 40 includes a processor 50, memory 55 and input/output capability 60 coupled to a system bus 65. The memory 55 is configured to store instructions which, when executed by the processor 50, perform the methods described herein. The memory 55 may also store the access units. Input/output 60 provides for the delivery and receipt of the access units. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the system 40 is controlled by operating system software executing in memory 55. Input/output and related media 60 store the computer-executable instructions for the operating system and methods of the present invention as well as the access units. The encoder 109, the decoder 119, the description constructor 127 and the description validator 129 shown in FIG. 1 may be separate components coupled to the processor 50, or may embodied in computer-executable instructions executed by the processor 50. In one embodiment, the computer system 40 may be part of, or coupled to, an ISP (Internet Service Provider) through input/output 60 to transmit or receive the access units over the Internet. It is readily apparent that the present invention is not limited to Internet access and Internet web-based sites; directly coupled and private networks are also contemplated.

It will be appreciated that the computer system 40 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Next, the particular methods of the invention are described with reference to flow diagrams in FIGS. 3 and 4 that illustrate the processes performed by the server 107 and FIG. 5 that illustrates the process performed by the client system 113. The processes may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 3–5 without departing from the scope of the invention and that no particular order is implied by the arrangement of blocks shown and described herein.

Figure 3:
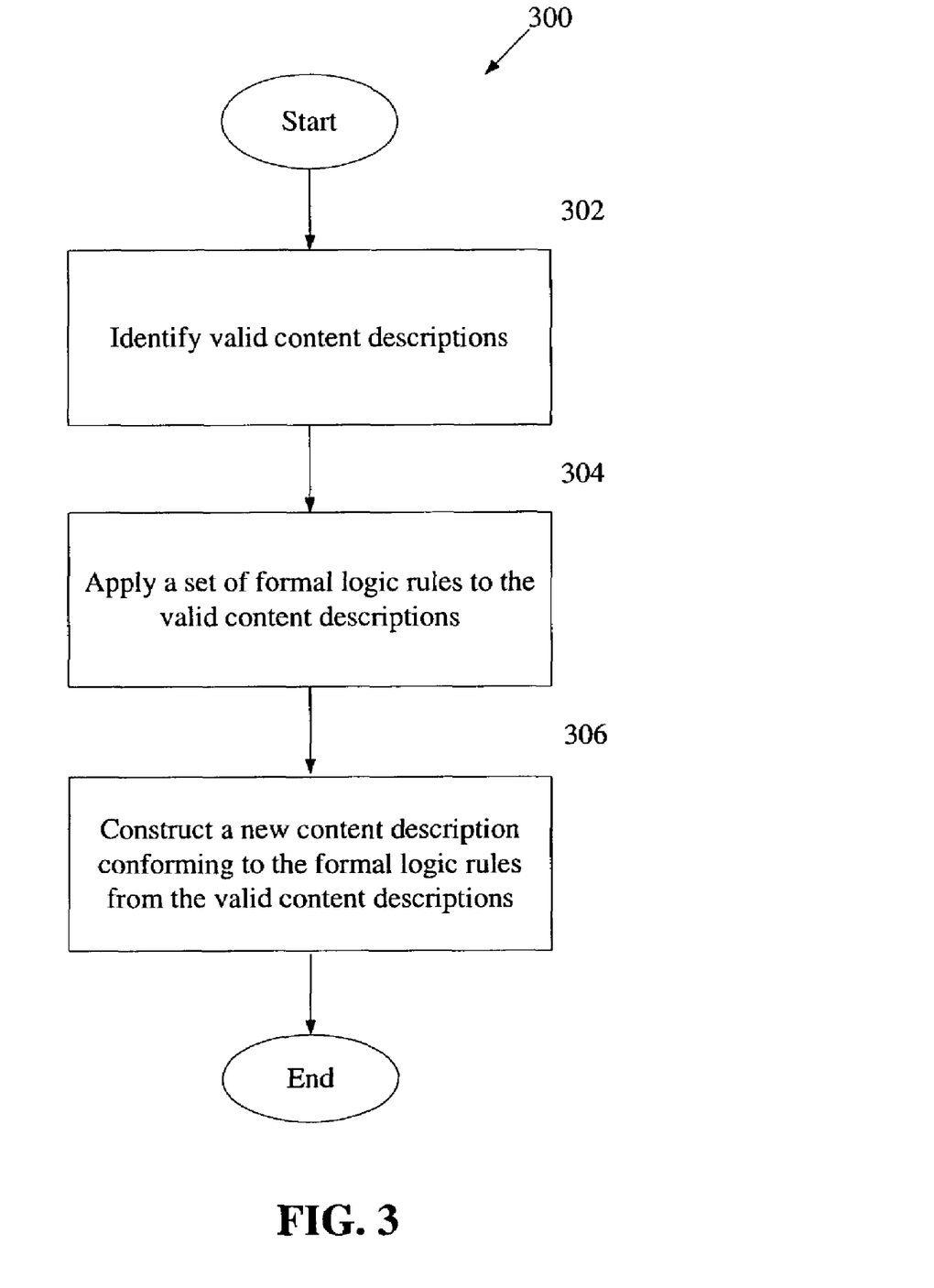
FIGS. 3–5 are flow diagrams of processes performed by a computer according to alternative embodiments of the invention.
Figure 4:
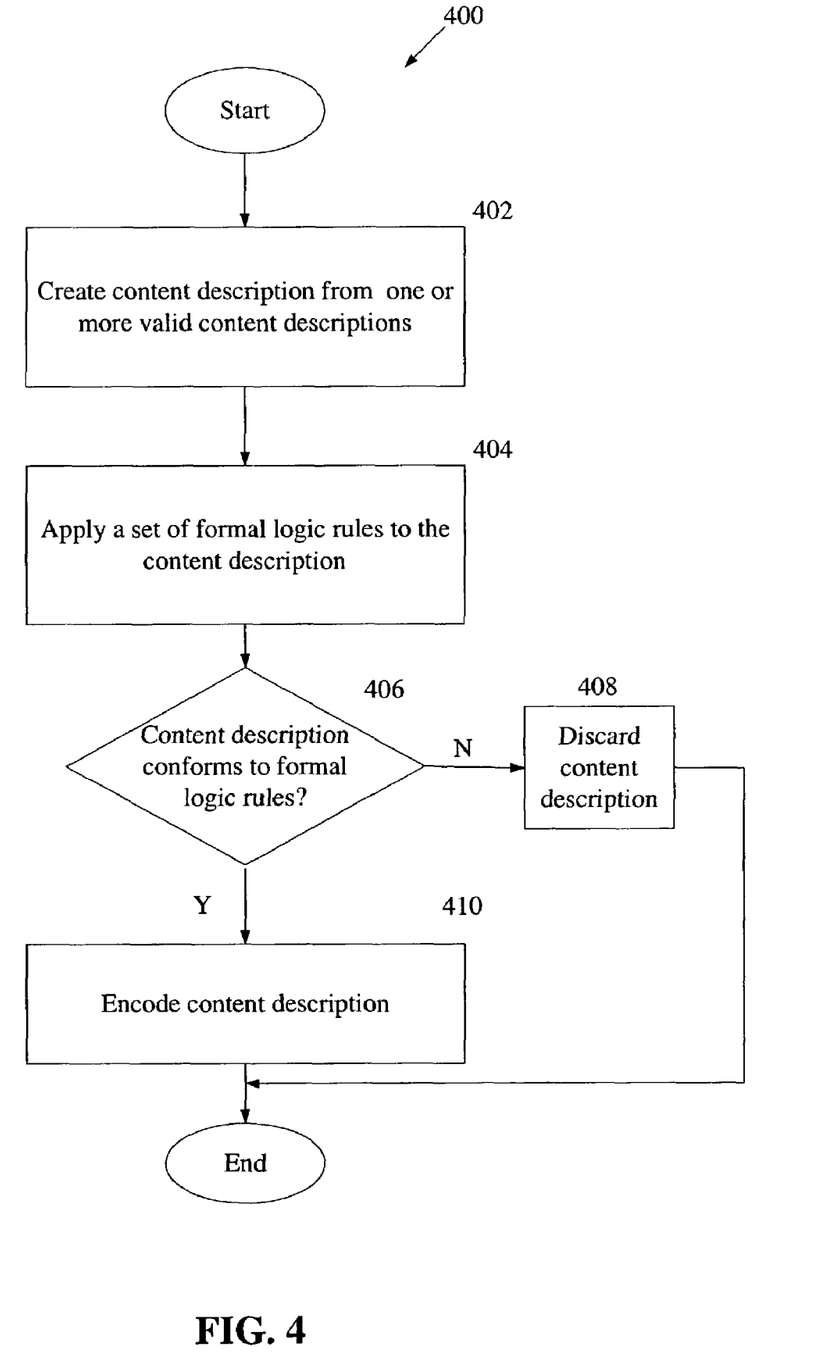

FIGS. 3 and 4 are flow diagrams of alternative embodiments of a process for creating content descriptions using formal logic rules.

Referring to FIG. 3, process 300 begins with processing logic identifying one or more valid content descriptions that can be used as a source of a new content description (processing block 302). The identification process is performed upon receiving one or more elements associated with the new content description (e.g., an adjectival property of the entity being described, a relationship between this entity and another entity, the structure of the entity, etc.). Based on the received elements processing logic identifies existing content descriptions that have common elements with the new content description and determines whether these existing content descriptions are valid (i.e., are in conformity with the formal logic rules) if their validity is not explicit. That is, if the existing content descriptions were selected from a repository that stores only valid descriptions, the validation is not performed. Alternatively, the validation is performed. Specifically, in one embodiment, each content description is stored with a validation indicator which is used to determine whether the content description is valid. In another embodiment, each of the selected descriptions is analyzed to determine whether it conforms to the formal logic rules as will be described in more detail below.

Next, processing logic applies a set of formal logic rules to the selected content descriptions to determine whether a particular operation can be performed on one or more of them (processing logic 304). The set of formal logic rules defines the requirements for constructing valid content descriptions from existing content descriptions. The operation to be performed on the selected content descriptions may be a concatenation operation for combining two or more content descriptions, a split operation for dividing a content description into portions, a modification operation for modifying an element of a description into a different element, a combination of any of the above operations, etc.

Once processing logic determines that the operation is valid, it performs this operation and constructs a new content description that conforms to the set of formal logic rules (processing block 306). Specifically, the structure of the new content description, its entities and the relationships between these entities are in conformity with the corresponding formal logic rules. In one embodiment, the new content description is presented as a graph, which is created using formal logic rules for writing graphs.

Referring to FIG. 4, method 400 begins with processing logic creating a new content description from one or more valid content descriptions (processing block 402). Valid content descriptions are identified in the same manner as described herein with reference to FIG. 3. The new content description may be created using a concatenation operation, a split operation, a modification operation, a combination of any of these operations, or any other similar operation. However, because processing logic does not use the formal logic rules when creating the new content description, the use of such operation (and accordingly the resulting new content description) may or may not be valid.

Next, processing logic applies the set of formal logic rules to the new content description (processing block 404). Specifically, processing logic verifies whether the operation performed on the existing content descriptions was valid and whether the structure of the new description, its entities and the relationships between these entities are in conformity with the corresponding formal logic rules.

If the verification is successful (decision box 406), processing logic encodes the new content description at processing box 410 into an instance document which will be used to search, filter, and/or browse the corresponding content data stream. Alternatively, processing logic discards the new content description (processing block 408) or modifies it.

Figure 5:
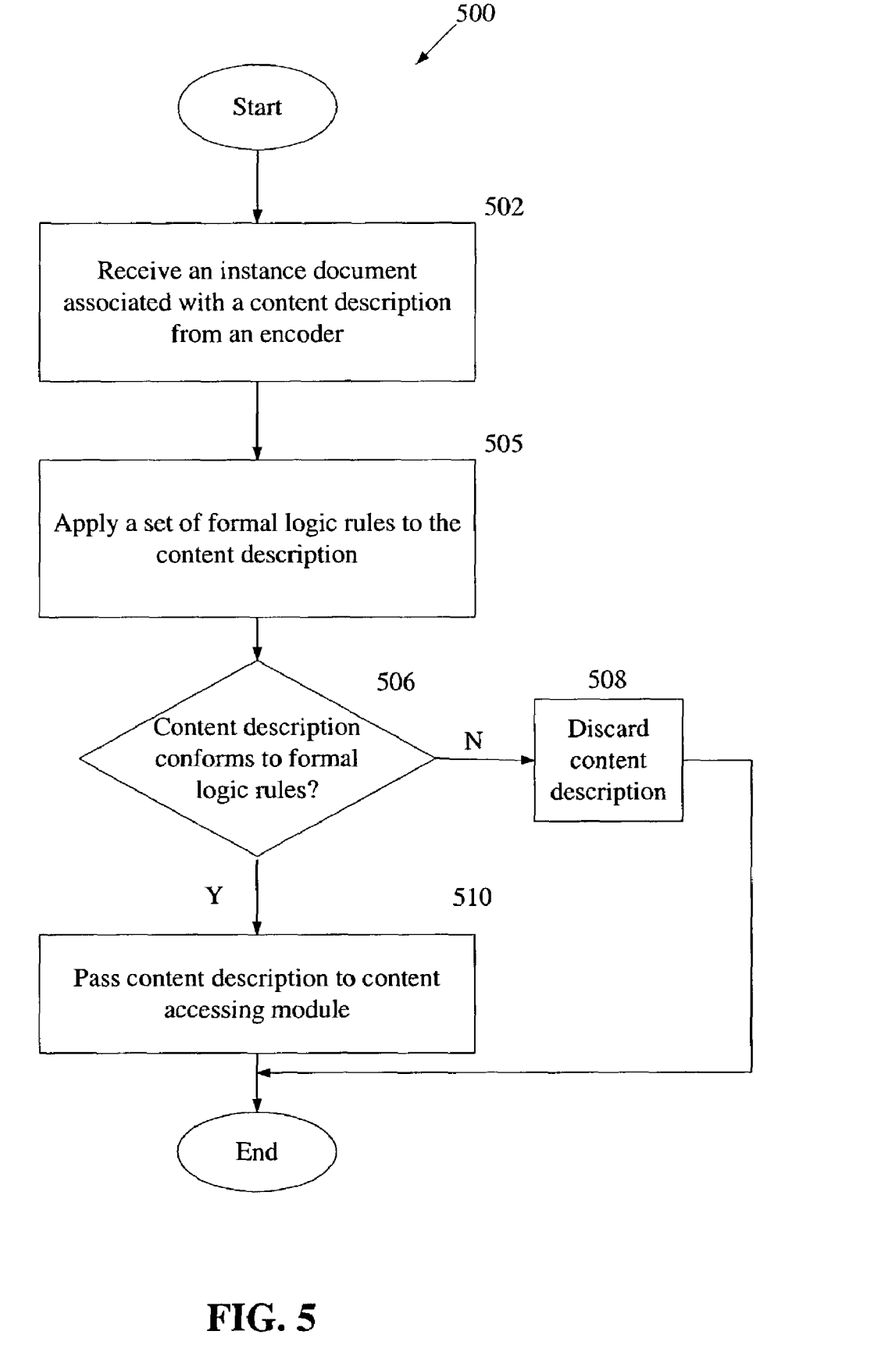

FIG. 5 is a flow diagram of one embodiment of a process for validating a content description using formal logic rules.

Referring to FIG. 5, method 500 begins with processing logic receiving an instance document associated with a content description from an encoder (processing block 502) and decoding the instance document into the original content description which may or may not be valid.

Next, processing logic applies the set of formal logic rules to the content description (processing block 504). Specifically, processing logic verifies whether the operation performed on the existing content descriptions was valid and whether the structure of the content description, its elements and the relationships between the elements are in conformity with the corresponding formal logic rules.

If the validation is successful (decision box 506), processing logic passes the content description at processing box 510 to a content accessing module which will use the content description to search, filter, and/or browse the corresponding content data stream. Alternatively, processing logic discards the content description (processing block 508).

The formal logic rules will now be described in more detail. Formal logic that defines the MPEG-7 description process includes a set of axioms and a set of rules of inference that will be described in more detail below. The specification of formal logic enables the definition of corresponding formal logic rules that specify the requirements for constructing valid content descriptions from existing content descriptions. With respect to semantic descriptions, formal logic is based on the definition of basic elements of semantic descriptions and on the entities that can be constructed from these basic elements. The basic elements of semantic descriptions include semantic entities, relations and graphs.

Semantic entities are derived from the "SemanticBase DS" (description scheme) defined in the MPEG-7 schema. The SemanticBase DS describes narrative worlds and semantic entities in a narrative world. Specifically, narrative worlds are described by a Semantic DS (further abbreviated as "S"). Perceivable or abstract objects are described by the Object DS (further abbreviated as "Ob"). A perceivable object is an entity that exists, i.e., has temporal and spatial extent, in a narrative world (e.g. "Tom's piano"). An abstract object is the result of applying abstraction to a perceivable object (e.g. "any piano") which generates an object template. The Event DS (further abbreviated as "Ev") describes a perceivable or abstract event. A perceivable event is a dynamic relation involving one or more objects occurring in a region in time and space of a narrative world (e.g., "Tom playing the piano"). An abstract event is the result of applying abstraction to a perceivable event (e.g. "anyone playing the piano"), which also generates a template of the event. The Concept DS (further abbreviated as "C") describes a semantic entity that cannot be described as a generalization or abstraction of a specific object, event, time place, or state. It is expressed as a property or collection of properties (e.g. "harmony" or "ripeness"). It may refer to the media directly or to another semantic entity being described. The SemanticState DS (further abbreviated as "St") describes one or more parametric attributes of a semantic entity at a given time or spatial location in the narrative world, or in a given location in the media (e.g., the piano's weight is 100 kg or the cloudiness of a day). The SemanticPlace DS (further abbreviated as "P") and SemanticTime DS (further abbreviated as "T") describe respectively a place and a time in a narrative world.

The above basic semantic entities that derive from the SemanticBase DS form the nodes in a graph, together with other entities that can be regarded as external to the basic semantic entities. These external entities include the MediaOccurence DS (further abbreviated as "M") which provides a reference or mapping to the content or descriptors of the content, the AnalyticalModel DS (further abbreviated as "A") which specifies semantic labels that indicate the classes being modeled, and the Graph DS (further abbreviated as "G") which defines structure of the semantic description. The Graph DS formally is a mechanism for creating labeled graphs that allows the use of labels both on the nodes and on the edges.

Relations associated with a semantic entity are intended to point outward from that entity, i.e., the entity in which they are found is the source of the relation. Relations form the edges in a graph. The edges are described by the SemanticRelation DS. The relations will be further defined in connection with graphs.

A graph is a pair of sets together with a pair of functions between the pair of sets. Specifically, according to algebraic graph grammars, a graph $G=\{E, V, s, t]$ is an ordered 4-tuple, comprising a set E, called the set of edges, a set V called the set of vertices or nodes, and two maps including s: E•V taking each edge to its source and t: E•V taking each edge to its target. Next, a graph morphism F between graph G and another graph H is a map taking edges to edges, nodes to nodes, and having such property that $s(F(e))=F(s(e))$ and $t(F(e))=F(t(e))$ for any edge e in E. Further, the category Graph comprises objects consisting of graphs, and morphisms consisting of graph morphisms.

Based on these definitions many possible categories of graphs are possible. This is principally because additional structures can be added to the sets E and V, or that various slice or comma categories may be created from the category Graph. In particular, labeled graphs may be generated as a comma category, and multigraphs may also be generated this way.

Referring again to relations, an n-ary relation on a set A is a set Rs=AxAx . . . x A of ordered n-tuples. In addition, R can be construed as a characteristic function on the set of ordered n-tuples in A. Next, a fuzzy subset of a set A is a function•(a) from A•[0,1]. The function • is called the membership. Further, a fuzzy n-ary relation on a set A is a fuzzy subset R on the set AxAx . . . xA.

Descriptions are constructed by combining together semantic entities, expressing relations between the semantic entities and possibly including a Graph DS that defines the structure of the description. Alternatively, the structure may be expressed as the sum total of the relations that originate and terminate within the description or, for some DS, by recursion, producing a tree of sub-entities below the given DS. In addition, the structure may be expressed by reference (instantiation) consisting of a graph morphism to an abstracted graph. Because of these various methods, the structure in a semantic description may be fully explicit (i.e., when graphs are used), fully implicit (i.e., using only properties to modify objects and events, and no graph structures), or partially implicit (i.e., using a mixture of internal properties of objects and events and external graphical structures to create descriptions). Certain relation types allow any of the above structures to be fully explicit.

A resulting semantic description may be evaluated by analyzing its expressive power. It should be noted that the expressive power can only be determined for the fully explicit descriptions. The expressive power of the semantic descriptions depends on the number of factors. These factors define (1) whether the semantic entities are sufficiently rich to express any entity in a description, (2) whether the relations between entities are sufficient to express any structure in a description, and (3) whether the relations between descriptions are sufficient to allow mapping of human descriptions to semantic descriptions.

The following axioms associated with the MPEG-7 process can be used to determine the factors that define the expressive power of the semantic descriptions:

Axiom: It is possible to represent any spatially occurring phenomenon in multimedia (and possible elsewhere) by listing a collection of properties sufficiently long that the phenomenon is distinguished from its surroundings, and that it is distinguished from similar phenomena.

Axiom: It is possible to represent any temporally occurring phenomenon in multimedia (and possible elsewhere) by listing a collection of properties sufficiently long that the phenomenon is distinguished from what occurs before and after, and that it is distinguished from similar temporal phenomena.

The SemanticBase DS allows the writing of arbitrary sets of properties. Accordingly, based on the axioms, the semantic entities are sufficiently rich to describe any spatiotemporal entity in the description, and the first factor defining the expressive power of the semantic descriptions is satisfied.

With respect to the second and third factors, when arbitrary rather than normative relations are used, these factors may not be satisfied. Specifically, the range of structure within semantic descriptions and between semantic descriptions is equivalent to the range of structure of the category Graph because the Graph DS allows the category Graph to be expressed as the sets of edges and nodes and graph morphisms. Accordingly, the expressive power of Graph is the issue. The expressive power may be noted in two ways: (1) the category Graph is a topos, expressible as an exponential of the form Set$^C$ where C is a small category, i.e., Graph is as rich in property as the category Set; and (2) the category Graph is isomorphic to Cat, the category of small categories. These properties allowed Lawvere to demonstrate that the category Graph is capable of writing any Turing computable expression, i.e., any expression that can be written by a Turing machine, and hence by any digital computing device of the form of our digital computers. When normative relations are used that are defined in a predefined list of relations, the expressive power may or may not be affected depending on the completeness of the list.

Further, because some of human descriptions describe entities by analogical processes, some features of the topos Graphs are required to be expressible. These features are subobject classifiers and transitive subobjects. That is, in order to extract a subgraph from a graph, thus allowing allusion to a part of another description, semantic descriptions are required to allow subobject classifiers that are specifications of subobjects, similar to membership functions and characteristic functions. In addition, in order to properly construct new descriptive pieces by composing previously-occurring descriptive pieces, thus reusing descriptions by analogy, the descriptions are required to handle transitive subobjects which involve an element of a description that is also a subgraph of the structure of the description.

Several rules of inference will now be described with reference to constructing semantic descriptions. The operations and descriptions that work in concert to produce semantic descriptions can be modeled as elements of a labeled graph, with labeled, parametrized edges. In addition, the node set operates by refinement, and the graph productions in the Graphical Classification Schemes operate by categorical graph productions. Using the symbol • to denote "is refined by" and abbreviations of semantic entities provided above, the refinement of the most basic description, the Semantic DS (S), by any other semantic entity derived from the Semantic Base DS, any external entity described above, or a property (P) can be expressed as follows:

if S•B such that B•{S, Ob, Ev, St, C, T, P, G, M, A, P}, and S is valid, and B is valid, then S•S•B is valid.

That is, if S is refined by B, B is one of the above semantic entities, and both S and B are valid, then the refinement of S is valid.

There are several special cases of refinement in other DS:
Ob$_1$ and Ob$_2$ then Ob$_1$•Ob$_2$;
Ev$_1$ and Ev$_2$ then Ev$_1$•Ev$_2$;
Ob and Mo then Ob•Mo;
Ev and Mo then Ev•Mo.

Rules for writing graphs will now be described in more detail. The nodes in Graph DS may be any element of the standard DS type. Relation DS describes the edges in the graph. For binary relations:
If B and D and R then BRD, denoted.
Similarly:
Given {B$_1$, . . . , B$_n$} and R an n-ary relation, then R (B$_1$, . . . B$_n$).
For many descriptions, there are equivalent ways of creating the descriptions syntactically. That is, Ob•Ob is equivalent to ObROb where R is the relation "contains," and Ev•Ev is equivalent to EvREv where R is the relation "contains."

Concepts are lists of Properties. Properties can also occur within any DS derived from the SemanticBase DS. Consequently, we have the following equivalent forms:

A•P•A•C•P where • the "hasProperty" binary relation.

A graph in a semantic description can be described (1) implicitly, by relations contained in the nodes, (2) explicitly by a graph which contains only the relations, (3) explicitly by a graph that contains relations and nodes, with the nodes referencing elements of the description, and (4) explicitly and abstractly by nodes and relations between the nodes.

The formal process of creating abstractions will now be described in more detail. The formal abstraction process begins with a concrete description. This concrete description describes a particular instance of media, and contains no abstract quantities, or variables. To the extent that it can be well represented by a term, it is equivalent to a formal statement with no variables. There are two abstraction mechanisms: (1) a description may have some or all of its instances of media removed, thereby abstracting the media instance itself (since it may now be attached to multiple instances), or (2) one or more entities or structures within the description may be replaced by generic elements, representing a formal abstraction by the creation of variables. These cases are distinguished because they are distinct both in the minds of those describing the media, and because the standard does not contain descriptors that model the content itself, except by reference.

As was mentioned in the axioms above, the description of any spatiotemporal entity may be construed as a sufficiently long list of properties. In order to provide the enumeration of a property or properties, the properties are listed in the abstraction model. They formally correspond to sets in the domain of all descriptions. Finally, it should be noted that the domain of all descriptions is covered by the sets designated as properties, and that each concrete description, by the axioms above, is equivalent to a sufficiently rich intersection of these sets. Further, some properties or collections of properties do not correspond to concrete descriptions, or to abstractions formed from them. Consequently, we cannot describe the entire domain without the ability to generate these other subsets. Concepts are arbitrary collections of properties, not corresponding to specific semantic entities, and therefore fill this role. The abstraction model also allows the creation of higher order descriptions, in which the nodes of the implicit or explicit graph are relations, graphs, or graph morphisms.

There are 4 types of abstraction in the abstraction model: Media Abstractions, Abstractions, Properties, and Concepts. Properties and Concepts are respectively elements of the SemanticBase Ds and derived from the SemanticBase DS. Describing media abstractions and abstractions is done by use of the AbstractionLevel attribute. This attribute is not present when a concrete description is in place, is present and has value zero for media abstractions, and has value of one or higher for abstractions. For example, a media abstarction is formed by severing links with the content, i.e., B•Mo is abstracted to B$^0$.

Abstraction occurs when an element of a description is replaced by a variable, or equivalently, by a set. For first order abstractions, which need not have explicit structure, whether a DS is an abstraction is indicated solely by its abstraction level. Consequently, if, for instance, Chevy Camaro is abstracted to Car, syntactically all that happens is $B^0$ is abstracted to $B^1$. In a different domain, Car need not be an abstraction.

One may use higher order abstraction by raising the AbstractionLevel above 1. For example, we may choose to denote by $B^0$ our Chevy Camaro, indicating that it is a specific Chevy Camaro, but not attached to media. $B^1$ in this description, as indicated above, is formed by Car. We may choose to further abstract our Car in this description, to a class of sets, say Object. $B^2$ indicates that such an abstraction has taken place.

Let Rule denote a RuleGraph, Morph denote a MorphismGraph, and Alpha denote an AlphabetGraph. Together they form a unit that can create productions. As a single graph, encapsulated in a Semantic DS, they represent an abstraction on abstractions. In the above example, this would then be at an abstraction level greater than 2.

The use of formal logic specification in construction of content descriptions has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to MPEG-7 is meant to include all environments that provide content descriptions. Therefore, it is manifestly intended that this invention be limited only by the following claims and equivalents thereof.

What is claimed is:

1. A computerized method comprising:
   identifying one or more valid content descriptions that can be used as a source of a new content description that is a semantic description representing relationships among entities and events portrayed in the corresponding content;
   applying a set of formal logic rules to the one or more valid content descriptions; and
   constructing the new content description conforming to the set of formal logic rules from the one or more valid content descriptions.

2. The computerized method of claim 1 wherein constructing the new content description comprises:
   determining that the set of formal logic rules permits a reconstruction operation with respect to the one or more valid content description; and
   performing the reconstruction operation to construct the new description.

3. The computerized method of claim 2 wherein the reconstruction operation is at least one of a concatenation operation, a split operation, and a modification operation.

4. The computerized method of claim 1 wherein the new content description is represented by a graph.

5. The computerized method of claim 4 wherein the set of formal logic rules includes a subset of formal logic rules pertaining to nodes in the graph and a subset of formal logic rules pertaining to edges in the graph.

6. The computerized method of claim 1 wherein the set of formal logic rules is based on one or more axioms and one or more rules of inference.

7. The computerized method of claim 1 wherein each of the one or more valid content descriptions is a valid semantic description.

8. A computerized method comprising:
   applying a set of formal logic rules to a content description that is a semantic description representing relationships among entities and events portrayed in the corresponding content; and
   validating the content description if the content description is in conformity with the set of formal logic rules.

9. The computerized method of claim 8 further comprising:
   creating the content description from one or more valid content descriptions.

10. The computerized method of claim 9 wherein the content description is created using a plurality of predefined operations comprising a concatenation operation, a split operation, and a modification operation.

11. The method of claim 8 further comprising:
    receiving the content description from an encoder.

12. The computerized method of claim 8 wherein the content description is represented by a graph.

13. The computerized method of claim 12 wherein the set of formal logic rules includes a subset of formal logic rules pertaining to nodes in the graph and a subset of formal logic rules pertaining to edges in the graph.

14. The computerized method of claim 8 wherein the set of formal logic rules is based on one or more axioms and one or more rules of inference.

15. The computerized method of claim 8 wherein the content descriptions is a semantic description.

16. A computer readable storage medium that provides instructions, which when executed on a processor cause the processor to perform a method comprising:
    identifying one or more valid content descriptions that can be used as a source of a new content description that is a semantic description representing relationships among entities and events portrayed in the corresponding content;
    applying a set of formal logic rules to the one or more valid content descriptions; and
    constructing the new content description conforming to the set of formal logic rules from the one or more valid content descriptions.

17. The computer-readable medium of claim 16 wherein the new content description is represented by a graph.

18. The computer-readable medium of claim 16 wherein the set of formal logic rules is based on one or more axioms and one or more rules of inference.

19. The computer-readable medium of claim 16 wherein each of the one or more valid content descriptions is a valid semantic description.

20. A computer readable medium that provides instructions, which when executed on a processor cause the processor to perform a method comprising:
    applying a set of formal logic rules to a content description that is a semantic description representing relationships among entities and events portrayed in the corresponding content; and
    validating the content description if the content description is in conformity with the set of formal logic rules.

21. The computer-readable medium of claim 20 wherein the method further comprises:
    creating the content description from one or more valid content descriptions.

22. The computer-readable medium of claim 21 wherein the content description is created using a plurality of predefined operations comprising a concatenation operation, a split operation, and a modification operation.

23. A computerized system comprising:

a memory; and at least one processor coupled to the memory, the processor executing a set of instructions which cause the processor to identify one or more valid content descriptions that can be used as a source of a new description, to apply a set of formal logic rules to the one or more valid content descriptions, and to construct the new content description conforming to the set of formal logic rules from the one or more valid content descriptions, wherein the new content description is a semantic description representing relationships among entities and events portrayed in the corresponding content.

24. The system of claim 23 wherein the new content description is represented by a graph.

25. The system of claim 23 wherein the set of formal logic rules is based on one or more axioms and one or more rules of inference.

26. The system of claim 23 wherein each of the one or more valid content descriptions is a valid semantic description.

27. A computerized system comprising:

a memory; and at least one processor coupled to the memory, the processor executing a set of instructions which cause the processor to apply a set of formal logic rules to a content description, and to validate the content description if the content description is in conformity with the set of formal logic rules, wherein the content description is a semantic description representing relationships among entities and events portrayed in the corresponding content.

28. The system of claim 27 wherein the set of instructions further causes the processor to create the content description from one or more valid content descriptions.

29. The system of claim 28 wherein the content description is created using a plurality of predefined operations comprising a concatenation operation, a split operation, and a modification operation.

* * * * *